United States Patent [19]

Neroda et al.

[11] 4,322,647
[45] Mar. 30, 1982

[54] MOTOR ASSEMBLY

[75] Inventors: Thomas H. Neroda, Watertown; George A. Flaherty, Adams Center; David L. Evans, Rodman, all of N.Y.

[73] Assignee: The Scott & Fetzer Company, Watertown, N.Y.

[21] Appl. No.: 96,783

[22] Filed: Nov. 23, 1979

[51] Int. Cl.³ .............................................. H02K 11/00
[52] U.S. Cl. ........................................ 310/71; 310/42; 310/239; 310/158
[58] Field of Search ..................... 310/42, 43, 71, 239, 310/259, 90, 260, 270; 339/98, 158

[56] References Cited

U.S. PATENT DOCUMENTS

| | | | |
|---|---|---|---|
| 2,558,929 | 7/1951 | Bunish | 174/120 SC |
| 2,689,268 | 9/1954 | Peck | 174/115 |
| 2,981,788 | 4/1961 | Bunish | 174/115 |
| 3,621,118 | 11/1971 | Bunish | 174/115 |
| 3,660,592 | 5/1972 | Anderson | 174/115 X |
| 3,707,595 | 12/1972 | Plate | 174/115 |
| 3,749,817 | 7/1973 | Shiga | 174/120 SC X |
| 3,792,192 | 2/1974 | Plate | 174/120 SC X |
| 4,002,820 | 1/1977 | Paniri | 174/115 |
| 4,008,367 | 2/1977 | Sunderhauf | 174/120 SC X |

FOREIGN PATENT DOCUMENTS 225043  3/1958  Australia ............................ 174/115

Primary Examiner—J. D. Miller
Assistant Examiner—D. L. Rebsch
Attorney, Agent, or Firm—Pearne, Gordon, Sessions, McCoy & Granger

[57] ABSTRACT

A universal electric motor assembly having its various components mounted directly or indirectly on a stator core so that it avoids the requirement of a specialized motor housing while allowing a simplified progressive assembly. The stator core includes a harness which permits easy termination of the field winding wires and a push-in connection for both electrical brushes and motor leads. An armature, a brush holder assembly, and an armature support are simultaneously installed on the stator core to reduce and simplify assembly procedures.

18 Claims, 10 Drawing Figures

U.S. Patent  Mar. 30, 1982  Sheet 1 of 3  4,322,647
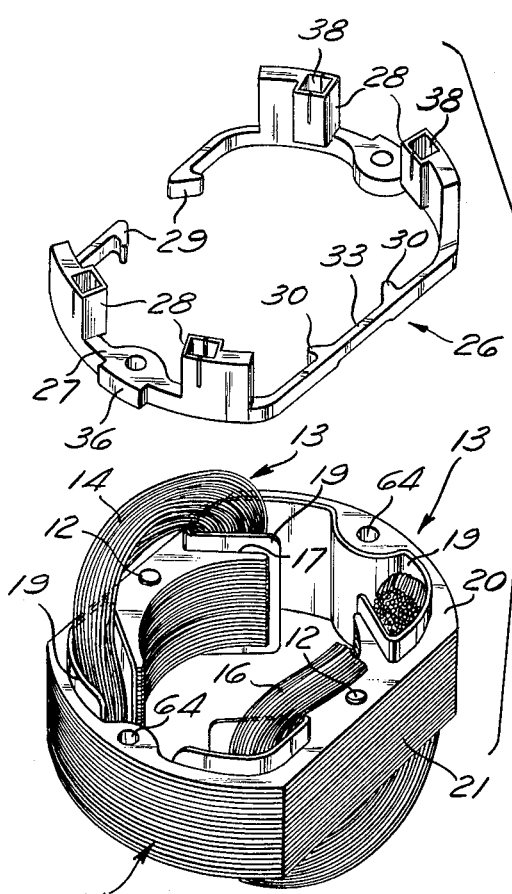
Fig. 1
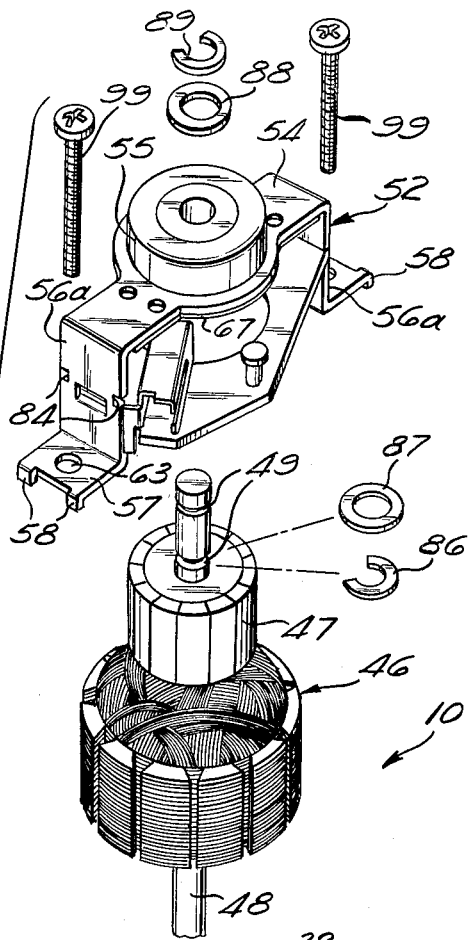
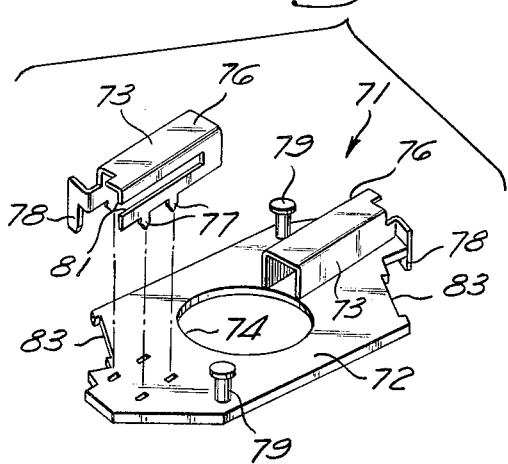
Fig. 2a
Fig. 2
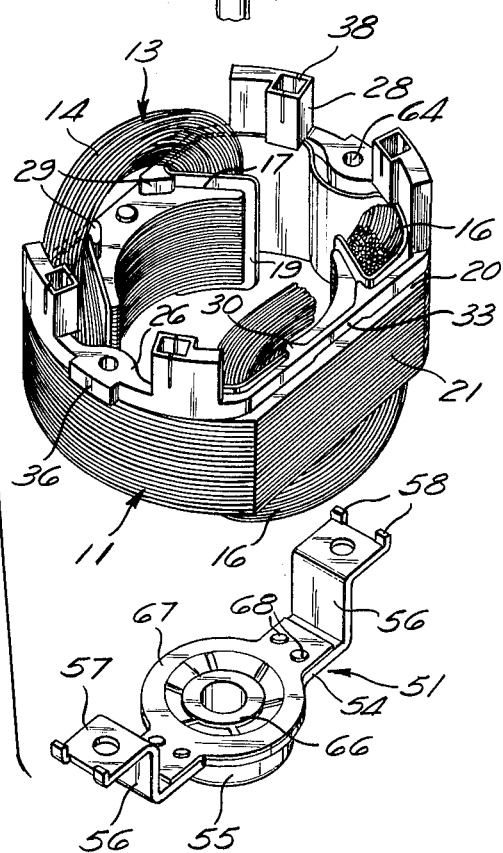

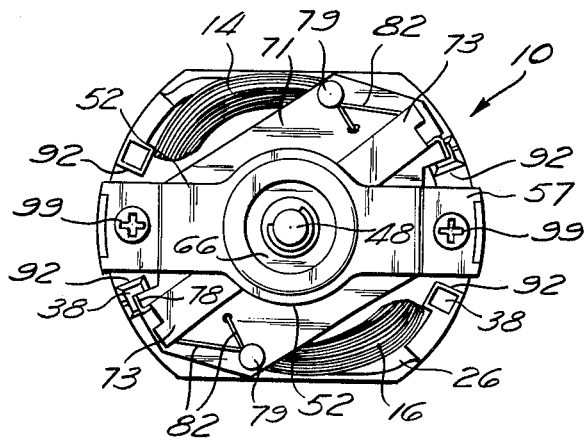
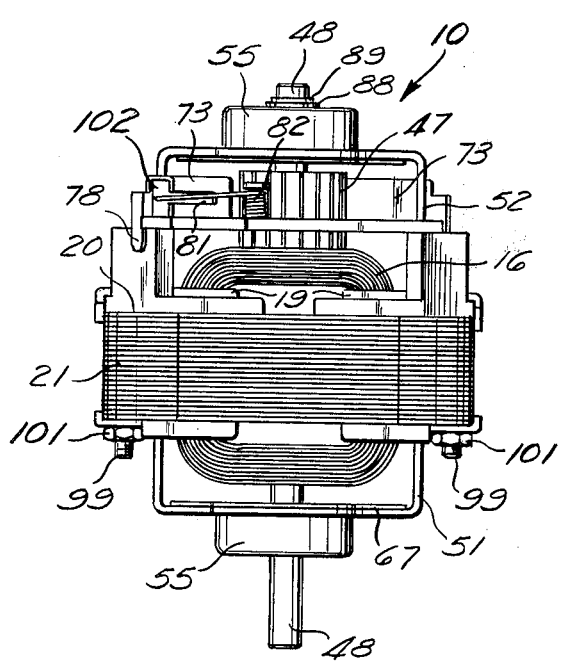
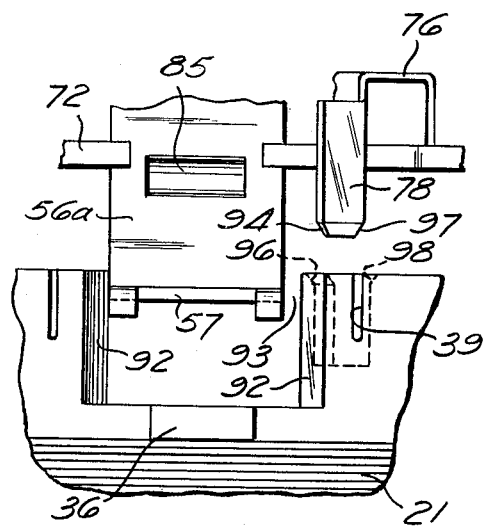
Fig. 3
Fig. 6
Fig. 4
Fig. 5

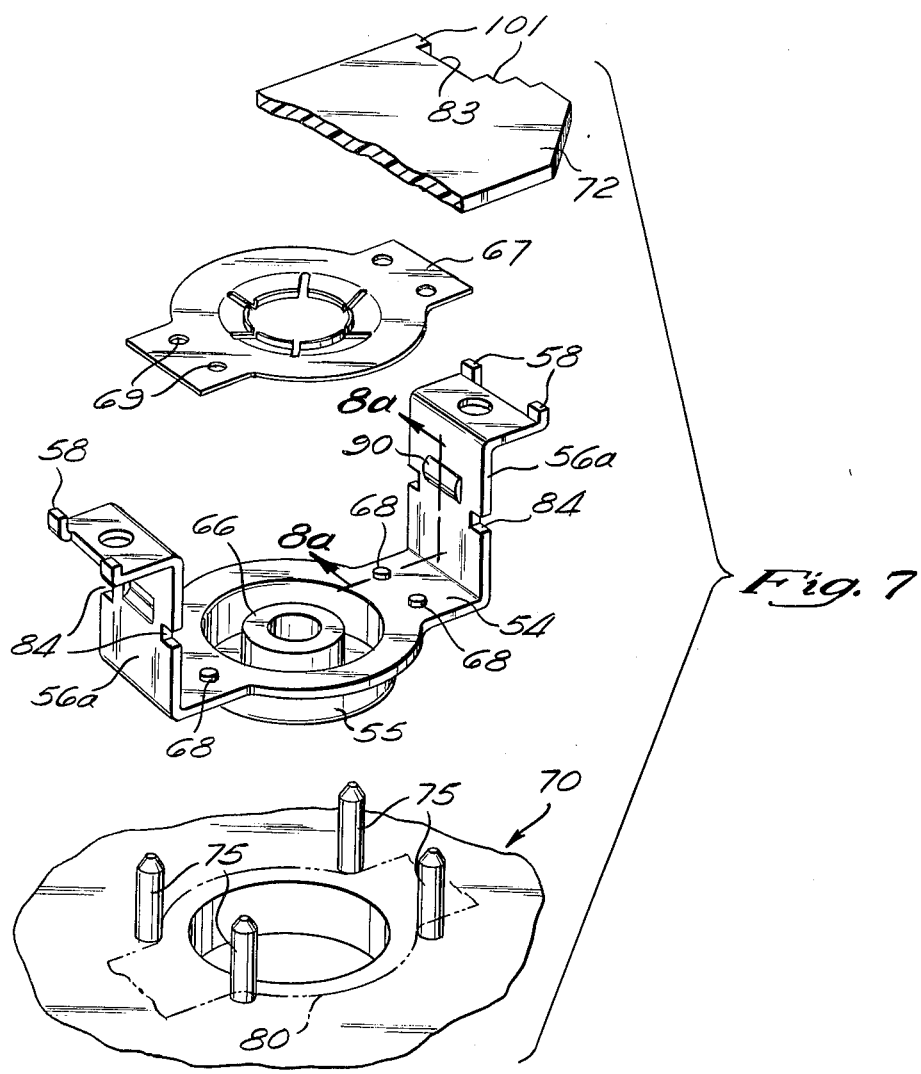
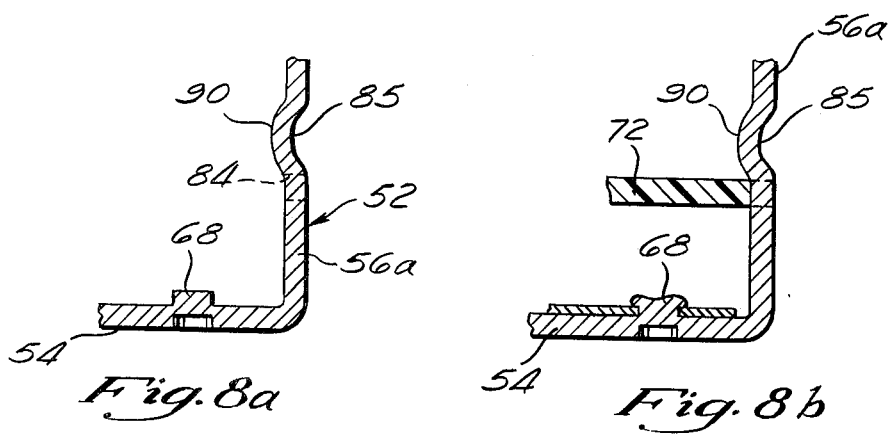

MOTOR ASSEMBLY

BACKGROUND OF THE INVENTION

The invention relates to electric motor construction and, in particular, to the manufacture of universal type electric motors.

PRIOR ART

Universal type electric motors are widely used for their characteristics of high power and small physical size. In the manufacture of this type of electric motor, a production bottle-neck has been experienced in the wiring, termination, or other connecting of the field winding and brush elements. The steps involved in connecting these various elements were often hindered by the ordinarily small and relatively fragile elements involved, and the restricted or obstructed areas in which such elements were situated.

Those who have sought solutions to these problems with attempts to simplify connections and automate assembly have generally designed motors with integrated housings so that terminals and/or brushes, as well as armature bearing supports, have been part of a housing or enclosure for the motor.

SUMMARY OF THE INVENTION

The invention provides a construction for a universal motor having a design adapted for use in a wide variety of appliances, machines, and the like. The disclosed motor design avoids reliance on an external housing for support of any of its individual components so that it can be used without modification or special tooling in diverse housing styles ranging from closefitting units to envelopes containing the motor and other hardware of like or greater bulk.

The disclosed motor is economical to produce as a result of its unique construction, which avoids tedious or difficult to automate steps of assembly, particularly in making circuit connections. Field and brush terminations are made with lay-in or plug-in connections easily accomplished without complex movements or positional tolerances.

The motor construction involves the independent make-up of stator core and armature subassemblies. The stator core and armature components are ultimately joined in a simple push-in procedure to essentially complete assembly of the motor. Since the stator core and armature components are separately constructed, the speed of assembly of one component need not hold up assembly of the other component. The subassembly components can thus be separately inventoried and stored to be used on demand.

According to the invention, all of the motor elements are loosely fitted together until a last step in assembly of the motor, when tension screws are tightened. This prefitting of the various elements allows them to favorably align to one another before they are locked finally together by the tension screws. At completion of their assembly, all of the motor components are supported directly or indirectly on the stator core. The manner in which the motor circuit elements are terminated allows the motor to be conveniently supplied to a customer with or without power leads. Assembly of such power leads is accomplished by a simple push-in step. This is of particular advantage because of the requirements found in the wide number of applications for which the disclosed motor assembly is suited. The power rating of the motor is readily modified by increasing or decreasing the length of the stator core lamination and armature without the necessity of changes in the remaining motor parts.

BRIEF DESCRIPTION OF THE DRAWINGS

FIG. 1 is a perspective view of a stator core and a terminal harness in axially exploded relation;

FIG. 2 is an axially exploded, perspective view of the major parts of a motor assembly;

FIG. 2a is a perspective view of a brush box subassembly of the motor assembly;

FIG. 3 is an end view at the brush side of the motor assembly;

FIG. 4 is a side view of the motor assembly;

FIG. 5 is a fragmentary, side view of a portion of a shaft support and brush holder being positioned on the stator core and terminal harness;

FIG. 6 is a fragmentary, perspective view, illustrating details of a typical terminal of the terminal harness.

FIG. 7 is an axially exploded view of a shaft support depicting details of its assembly; and FIGS. 8a and 8b illustrate further details of the shaft support assembly and a manner of attachment of a brush holder plate thereto.

DESCRIPTION OF THE PREFERRED EMBODIMENT

In the drawings, there is disclosed an electric motor assembly 10 of the universal type. A stator core 11 is composed of a stack or lamination of annular stampings permanently held together by rivets 12 or welds in customary fashion. A field winding 13 comprises a pair of opposed coils 14 and 16 in associated slots 17 formed in the body of the stator core 11. Sheets 19 of paper-based material or other electrically insulating material are disposed in the slots 17 prior to winding of the magnet wire forming the coils 14, 16 to protect the wires from the edges of the stator core laminations. The insulator sheets 19 project a distance from end faces 20 of laminations 21 of the stator core 11. Similarly, parts of the coils 14, 16 free of the slots 17 are spaced from these end faces 20.

The stator core 11 includes a C-shaped harness 26 having a planar web 27 and terminal support stations 28 which are angularly disposed about an axis of the motor and extend axially away from the plane of the web 27. The harness 26 is formed of electrically insulating material, preferably by injection molding a suitable plastic such as Valox 420, an engineering thermoplastic polyester sold by General Electric Co. The material forming the harness 26 is somewhat resilient. At the free or open ends of the C configuration of the harness and at points on its midsection, the harness 26 includes protrusions or hooks 29, 30. As indicated most clearly in FIG. 2, the protrusions 29, 30 interengage with areas of the sheet insulators 19 of the field coils 14, 16, and provisionally hold the harness 26 in place on the stator core 11. The material forming the harness 26, being somewhat resilient, allows a central area 33 of the harness web 27 to act as a hinge and various other areas of the web to elastically deflect and allow the protrusions 29, 30 to snap over respective areas of the field insulators 19. The harness is dimensionally molded so that in a free state, its geometry is slightly less than that of gripped points of the coil insulators 19. Cooperating pairs of hooks, i.e., a hook 29 at a free end of the web 27 and the hook 30 closest to it at the web center area 33, grasp the inside corners of opposite coils 14, 16. The hooks 29, 30 are dimensioned to fit under the space between the free portions of the coils and the stator core lamination end face 20. The protrusions 29, 30 hook onto the corners of the insulator sheets at the base areas of the slots 17, i.e., where the individual loops of the coils 14, 16 are smallest. Intermediate cooperating pairs of hooks 29, 30, locating tabs 36 extend axially from the plane of the harness web 27 in a direction opposite the terminal supports 28. The tabs or lugs 36 are adapted to index against the outside circumferential surfaces of the stator core laminations 21. The operative surfaces of the locator tabs 36 are generally opposed to the operative surfaces of the adjacent hooks 29, 30.

With reference to FIG. 6, the terminal supports 28 include rectangular cavities 38 sectioned by cross slots 39. Each slot 39 is adapted to receive one end of the magnet wire of an associated coil 14 or 16. Wire laced in a cross slot 39 is terminated by a terminal or solderless connector 41 having slots 42 which align with the cavity cross slots 39. The terminal slots 42 are dimensioned and otherwise constructed to strip insulating material from the magnet wire and make a permanent electrical connection therewith. An example of a typical connector suitable for use is disclosed in U.S. Pat. No. 3,984,908. Barbs 43 retain their associated terminals 41 in the respective cavities 38.

The described stator core subassembly, principally comprising the laminations 21, field coils 14, 16, and harness 26, is in a condition for assembly with remaining parts of the motor. As can be appreciated, the stator core parts are provisionally joined with sufficient integrity to allow them to be inventoried or otherwise stored for later use where immediate consumption is not desired.

An armature 46 of motor assembly 10 is generally conventional in design, and includes a commutator 47 adjacent one end. For purposes of economy, the armature shaft 48 maintains a constant diameter over the major part of its length to avoid machining operations. Either end of the shaft 48 may have extensions with a flat or machine threads or some other means of connecting it to a load. At the commutator end, the shaft 48 has a pair of axially spaced grooves 49 for receiving C washers.

Armature shaft supports 51, 52 of similar construction are provided at each end of the motor assembly 10. Opposite the commutator end of the motor, the shaft support 51 has a stepped structure ideally formed as a subassembly of stamped steel parts. The larger of these parts 54 comprises an end strap integrally formed with a cylindrical bearing cavity or bell 55, axially oriented stand-off legs 56, radially oriented flanges 57, and locating tabs 58. The bell 55 has a central opening 59 for clearance with the armature shaft 48. Holes 63 in the radial flanges 57 are adapted to align with diametrally opposed holes 64 to the stator core laminations 21. The locating tabs 58 are spaced from one another a distance corresponding to the transverse dimension of the stator core laminations 21 adjacent the holes 64 so that the tabs are adapted to locate the bell 55 concentrically with the axis of the stator core 11. A bearing 66, for example, a bronze bushing, is assembled into the bell 55 and retained therein by another part of the shaft support 51 in the form of an apertured plate 67 riveted to the main end strap 54.

With reference to FIGS. 8a, 8b, the end strap 54 is preferably formed with integral rivets 68 stamped into its body at the time of its fabrication for use in fixing the plate 67 to the end strap. For this same purpose, the plate 67 has a pattern of holes 69 (FIG. 7) adapted to mate with rivets 68. FIG. 7 schematically illustrates a production fixture 70 advantageously employed to align individual plates 67 and shaft supports 52. The fixture relies on the illustrated substantially identical peripheral configuration of the end strap 54 and plate 67, as viewed endwise or axially of the motor, to align one to the other with a set of four pins 75. The configuration of the end strap 54 and plate 67 includes a circular central portion interrupted by diametrally extending branches, as indicated in phantom in FIG. 7, at 80. The pins 75 are critically spaced in tangency to the points of intersection of the phantom circle and branches. By positioning the end strap 54 and then the plate 67 in the fixture 70, these elements are accurately aligned to one another with minimal effort.

With a bearing 66 sandwiched between the end strap 54 and plate 67 and the rivets 68 extending through the holes 69, the rivets are upset by a suitable tool, as indicated in FIG. 8b, to capture the bearing and plate onto the end strap. It will be understood that both the plate 67 and the bearing support 52 are bilaterally symmetrical with respect to a line perpendicular to the diametral direction of their branches, which permits their loading into the fixture 70 without regard to which end or branch is associated with which pair of related pins 75.

The armature shaft support 52 at the commutator end of the motor differs from the opposite shaft support 51 by having relatively longer legs 56a to accommodate the length of the commutator 47. Various other elements of these shaft supports or brackets 51, 52 are essentially the same, and are designated by the same numerals.

A brush holder assembly 71 is supported between the support legs 56a. The brush holder 71 assembly principally comprises an electrically insulating plate 72 and a pair of opposed brush boxes 73. The plate 72 is preferably stamped or otherwise formed into a polygonal configuration from sheet stock, with its center blanked out to form a clearance aperture 74 for the commutator. The brush boxes 73 are preferably formed of brass or other electrically conducting metal and are radially disposed on opposite sides of the plate aperture 74. Each box 73 includes an elongated U-shaped channel 76 with tabs 77 along longitudinal edges. The tabs 77 are inserted into holes punched or otherwise formed in the brush holder plate 72 and are bent over to retain the boxes to the plate 72. One side of each brush box 73 has an integral tab or prong 78 which depends radially over and axially inward of the plane of the plate 72. Upstanding rivets 79 are assembled in holes adjacent a longitudinal slot 81 in one side of each box 73 for purposes of mounting a brush spring 82, as discussed hereinbelow.

The brush holder assembly 71 is joined to the shaft support 52 by snapping the plate 72 into interlocking relation with the support legs 56a. The plate 72 and legs 56a are formed with cooperating slots 83 and 84 respectively. The transverse width of a plate slot 83 is substantially the same in dimension as the residual width of a support leg 56a remaining between a pair of slots 84, while the width of the slots 84 in the axial direction of the motor is at least as great as the thickness of the plate 72. Each support leg 56a is provided with an integrally formed rib 85 protruding from its plane towards the opposite leg. The ribs 85 are shaped to facilitate assembly of the plate on the shaft support 52. With reference to FIG. 8b, a rib includes a cam or ramp surface 90, which, when forcibly engaged by an edge 91 of the plate 72 as the plate is pushed towards the end strap 54, causes the legs 56a to spread, allowing tabs 101 on the plate 72 to align with and then snap into slots 84 in the support legs 56a. Inclined surfaces 102 of the ribs 85 hold the plate 72 snugly in the slots 84. The support legs 56a are sufficiently resilient to permit their temporary spreading for reception of the relatively rigid plate 72. The width of the plate 72 as measured across its slots 83 is dimensioned with respect to the inside dimension between the support legs 56a so as to provide a permanent interference fit and assure that the plate is snugly held by the legs. The plate 72 ultimately rests in a plane perpendicular to the axis of the armature shaft 48.

After installing the brush holder, the armature is assembled on the shaft support 51. This is readily accomplished by first assembling a C-washer 86 in a respective shaft groove 49 and a thrust washer 87 on the shaft outward of the C-washer. Following this, the armature shaft 48 is slipped through the bearing 60 and a second thrust washer is assembled over the outer end of the shaft, followed by a second C-washer 89 in the outermost groove 49. The armature shaft 48 is thus axially locked to the shaft support 51 by the C-washers 86, 89.

It will be understood from the foregoing that the armature assembly 46, shaft support 52, and brush box assembly 71 are secured together at this stage with ease, there being no problems during their assembly of physical interference with the stator core 11. This armature, support, and brush box subassembly can be handled immediately for use or can be inventoried for later use as desired without association of the stator core 11.

The stator core 11 is assembled with the armature dressed with the shaft support 52 and brush holder assembly 71 by simply dropping the armature through the center of the stator core. As indicated in FIG. 5, the legs 56a lead the brush prongs 78 and are caused to enter the space between a pair of adjacent terminal supports 28. The spacing between edges 92 of the supports 28 in relation to the width of the radial flanges 57 of the support legs 56a is such that the prongs 78 are coarsely aligned with their associated cavities 38. In the view of FIG. 5, the illustrated support leg 56a and flange 57 are at the extreme left in the gap between supports 28, the clearance being indicated at 93 between one of the terminal supports 28 and this leg. It will be seen, even in this extreme case, engagement between inclined guiding surfaces 94 and 96 of the prong 78 and cavity 38 will cause the prong to center itself with the cavity in an angular or circumferential direction with respect to the stator core. This type of camming action would occur if the leg 56a and flange 57 were at the right and surfaces 97 and 98 of the prong and cavity were operative. Further axial movement of the armature 36 and support 52 causes the prongs or connectors 78 to enter and electrically connect with the respective terminals 41 in the terminal supports 28. Any differences between the diametral spacing between the brush prongs 78 and the diametral spacing between the associated rectangular cavities 38 is readily taken up by slight elastic distortion of the harness web 27, allowing the terminal supports 28 to flex radially inwardly or outwardly as necessary to accommodate the prongs 78. When the radial flanges 57 of the support legs 56a are abutted against the harness web 27, the shaft support 52 is fully installed. The opposite shaft support 51 is then slipped over the opposite end of the armature shaft 48 and abutted against the associated stator core end face 20. At this point, substantially all of the motor elements are loosely assembled together, and are capable of aligning themselves to positions which account for the various dimensional tolerances involved in their manufacture. In this manner, the armature shaft 48 can seat itself in the bearings 66 without binding or excessive strains in various parts of the motor. Tension screws 99 assembled through the bearing support holes 63 and stator holes 64 are then drawn tight with nuts 101 to substantially complete construction of the motor. The screws 99 can be provided with additional length to that illustrated for purposes of mounting the motor to a housing structure or other support. Electrical brushes 102 are most conveniently slipped into the brush boxes 73 after the armature 46 is assembled with the shaft support 52. The brushes 102 are retained in the boxes 73 and are biased against the commutator by the springs 82 assembled on the rivets or posts 79, as indicated in FIGS. 3 and 4. As shown, the springs 82 operate through the slots 81.

Lead wires, indicated in phantom at 106 in FIG. 6, are pushed into a pair of connectors 41 not associated with the brush prongs 78. Such lead wires 106 can be installed by the manufacturer of the motor or a customer of such manufacturer. This freedom to install lead wires 106 after assembly of the motor has otherwise been completed affords a high degree of versatility to the motor, since the lead wires can be custom fit at any time.

It will be understood from the foregoing explanation that the axial length of the stator core laminations 21 and armature assembly 46 can be changed to modify the power rating or performance characteristics of the motor without requiring a change in any of the other disclosed motor elements, with the exception of the tension screws 99. Where desired, the shorter armature shaft support 52 may be replaced by one like the longer support 52 to provide clearance for an internal cooling fan mounted on the intermediate length of an extended armature shaft. The disclosed motor assembly 10 can be mounted in a variety of appliances and machines without changes in its structure, since it is a self-contained unit. All of its various parts, and in particular the shaft supports 51 and 52, are supported directly or indirectly by the stack of stator core laminations 21.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An electric motor assembly comprising a stator core and an armature supported in the stator core, said stator core having axially spaced, annular end faces and field coils of magnet wire wound on opposite sides of the core, said field coils including looped portions extending axially from and circumferentially across one of said end faces, a terminal harness formed of electrically insulating resilient material, a set of solderless electrical terminals carried on said harness, ends of the magnet wire of the field coils being connected directly to said terminals, said harness including a plurality of hooks adapted to lock around said looped portions of said field coils to provisionally hold said harness on said stator core, said harness being constructed and arranged to permit it to elastically deform from a free state to allow said hooks to snap around said looped portions of said field coils after said field coils are wound on said stator core and then relax into a condition wherein said hooks maintain said harness on said stator core.

2. A motor assembly as set forth in claim 1, wherein said field coil looped portions are displaced from said one end face to define spaces therebetween, said hooks being arranged to extend into said spaces.

3. A motor assembly as set forth in claim 2, wherein said stator core includes axially extending slots, said field winding being coiled in said slots with the innermost loops being disposed at the bases of said slots, said hooks being arranged in cooperating pairs, each cooperating pair of hooks embracing the innermost loops of opposite coils.

4. A motor assembly as set forth in claim 2, wherein said stator core includes an outer circumferential surface, said harness including locator surface means engaging said circumferential surface, said hooks having operative surfaces generally opposing said locator surface means.

5. A motor assembly comprising a stator core including field windings and opposed end faces, solderless electrical terminals assembled on said stator core and connected to said field windings, an armature including a shaft and a commutator, a shaft support bracket secured to said stator, said shaft support bracket including means to support said shaft for rotation in said stator core, a brush holder assembly carried on said support bracket, said support bracket including means for engaging one of said stator core end faces for mounting said support bracket to said stator core, said brush holder assembly including means for automatically effecting electrical connections with said terminals subsequent to assembly of said terminals on said stator core when said support bracket is positioned on said stator core.

6. A motor assembly as set forth in claim 5, wherein said support bracket includes a bearing for supporting said armature shaft for rotation, and means axially locking said shaft in said bearing in both directions, whereby said shaft is fixed with said shaft support bracket and is conveniently installed and removed from said stator core with said support bracket.

7. A motor assembly as set forth in claim 5, wherein said brush holder assembly includes brush boxes formed of electrically conductive metal, said brush boxes including integral tabs having an axial orientation and being arranged to connect with said terminals when said support bracket is installed on said stator core.

8. A motor assembly as set forth in claim 7, wherein said brush holder assembly includes a base plate of electrically insulating material, said brush boxes being mounted on said base plate, said support bracket including a pair of legs on diametrically opposite sides of said shaft, said legs and base plate including interlocking portions, said legs having cam means responsive to relative axial assembly movement of said base plate to cause said legs to spread diametrically apart and allow said interlocking portions to snap together for assembly therebetween.

9. A motor assembly comprising an annular stator core, including field windings and opposed end faces, solderless electrical terminals assembled on said stator core and connected to said field windings, an armature including a shaft and a commutator, a shaft support bracket secured to said stator core at each end face thereof, each of said shaft support brackets carrying a bearing for rotationally supporting said armature shaft, one of said shaft supports having a pair of spaced legs extending axially from an associated end face of the motor on diametrically opposite sides of the armature shaft, a brush holder assembly supported on said one shaft support bracket diametrally between said legs and axially between the associated stator core end face and the associated bearing, said brush holder assembly including a pair of electrical brushes diametrally disposed on opposite sides of said commutator and angularly between said legs, said brush holder assembly including connector means for automatically effecting electrical connections with said terminals subsequent to assembly of said terminals on said stator core when said one shaft support bracket is assembled on said stator core.

10. A motor assembly as set forth in claim 9, wherein said shaft support brackets are steel stampings, said brush holder assembly including an electrically insulating base plate in direct engagement with said one support bracket.

11. A motor assembly as set forth in claim 10, wherein said one shaft support bracket includes a cylindrical cavity containing the associated bearing.

12. A motor assembly comprising an annular stator core including field windings and opposed end faces, terminal support means assembled on one of said end faces, electrical terminals carried on said terminal support means and connected to said field windings, an armature disposed in said stator core, said armature including a shaft and a commutator adjacent one end of the shaft, a pair of shaft support brackets each mounted at an opposite end face of the stator core and including a bearing for supporting said shaft for rotation, one of said shaft supports being associated with the commutator end of the motor, said one shaft support bracket being formed as a stamped metal component, said one shaft support bracket including a pair of legs extending on diametrically opposite sides of the armature shaft axially from said stator core end face to its associated bearing, a brush holder assembly supported by and disposed between said legs, said brush holder assembly including a base plate of electrically insulating material, slot means interlocking said base plate to said bracket legs, said plate being oriented in a plane perpendicular to the axis of said shaft and having a central aperture therethrough for clearance of said armature, a pair of brush containers formed of electrically conductive metal secured to said plate on opposite sides of said commutator, said metal brush containers including integral connector means having an axial orientation, said integral connector means being arranged to automatically connect with said terminals when said one shaft support bracket is assembled on said one stator core end face subsequent to the assembly of said terminal support means on said one stator core end face.

13. A motor assembly comprising a stator core, including field windings and opposed end faces, said stator core including a cylindrical bore, an armature disposed in said stator bore, said armature including a shaft and a commutator adjacent one end of the shaft, a harness mounted on an end face of said stator associated with said commutator, said harness including terminal stations circumferentially spaced about the armature, a set of electric terminals carried on said harness terminal stations and connected to said field windings, a pair of shaft support brackets each mounted at an opposite end face of the stator core and including a bearing for support of the shaft for rotation, one of said shafts being associated with the commutator end of the motor, said harness and said one shaft support bracket having cooperating indexing means for angularly aligning one to the other, a brush assembly carried on said one shaft support bracket, said brush assembly including electrical connectors for operably engaging a pair of said terminals when said one shaft support bracket is moved axially towards its associated stator end face, said cooperating indexing means being constructed and arranged to develop angular registration between said shaft support and said harness at a point of axial movement of said bracket towards said harness prior to engagement between said connectors and terminals, whereby said indexing means angularly indexes said connectors and terminals.

14. A motor assembly as set forth in claim 13, wherein said connectors and terminal stations include beveled guide means for completing angular alignment between said connectors and terminals as said shaft support bracket is moved towards a fully installed position from said point of movement wherein said indexing means is first operative.

15. A motor assembly as set forth in claim 14, wherein motor components represented by a group of said connectors and a group of said terminal stations include one such group being constructed and arranged to deflect radially to accommodate dimensional tolerances and spacing between said terminal stations and corresponding spacing between connectors.

16. In a motor assembly comprising a stator, an armature including a shaft disposed in the stator, means for supporting said shaft for rotation in said stator, said shaft support means including at one end of the motor a bracket element fixed to said stator and having a predetermined outer peripheral configuration when viewed in a direction along the axis of the shaft, a retainer element having an outer peripheral configuration when viewed in a direction along the axis of the shaft substantially identical to that of a portion of the bracket element, one of said elements defining a cavity, a bearing supported by said one element in said cavity, said elements cooperating to maintain said bearing in said cavity, said elements being arranged such that their peripheral configurations are capable of being precisely superposed and thereby aligned by a fixture having positioning surfaces operative on geometrically spaced areas of said peripheral configurations, and means securing said retainer to said bracket element.

17. In a motor assembly as set forth in claim 16, wherein said bracket and retainer elements have a configuration which is bilaterally symmetrical and whereby said elements have two potentially relative positions for assembly.

18. A motor assembly comprising an annular stator core, including field windings and opposed end faces, an armature including a shaft and a commutator, a shaft support bracket secured to said stator core at one end face thereof, said shaft support bracket carrying a bearing for rotationally supporting said armature shaft and having a pair of spaced legs extending axially from the associated end face of the motor on diametrally opposite sides of the armature shaft, a brush holder assembly supported on said shaft support bracket diametrally between said legs and axially between the associated stator core end face and the associated bearing, said brush holder assembly including a base plate oriented in a plane perpendicular to the axis of said shaft and having a central aperture for clearance of said armature, said brush holder assembly including a pair of electrical brushes supported on said base plate, said brushes being diametrally disposed on opposite sides of said commutator, said base plate and legs having mutually interlocking portions, said legs including cam means arranged to cooperate with areas of said base plate to cause said legs to spread diametrally apart for interengagement of said interlocking portions as said base plate is moved axially between said legs.

* * * * *

UNITED STATES PATENT AND TRADEMARK OFFICE
CERTIFICATE OF CORRECTION

PATENT NO. : 4,322,647

DATED : March 30, 1982

INVENTOR(S) : Thomas H. Neroda et al.

It is certified that error appears in the above—identified patent and that said Letters Patent is hereby corrected as shown below:

In Section [56] "References Cited", delete the <u>entire</u> list of U.S. Patent Documents Cited and substitute the following list therefor:

--3,412,270   11/1968   Wacek....................310/90--;

--4,038,573   7/1977    Hillyer et al. ..........310/71--; and

--4,049,984   9/1977    Ishii et al. ............310/42--.

Signed and Sealed this

Third Day of August 1982

[SEAL]

Attest:

GERALD J. MOSSINGHOFF

*Attesting Officer*   Commissioner of Patents and Trademarks